(12) United States Patent
Shamir

(10) Patent No.: US 11,475,309 B2
(45) Date of Patent: Oct. 18, 2022

(54) ASYMMETRIC FUNCTIONALITY ACTIVATION FOR IMPROVED STABILITY IN NEURAL NETWORKS

(71) Applicant: Google LLC, Mountain View, CA (US)

(72) Inventor: Gil Shamir, Sewickley, PA (US)

(73) Assignee: GOOGLE LLC, Mountain View, CA (US)

( * ) Notice: Subject to any disclaimer, the term of this patent is extended or adjusted under 35 U.S.C. 154(b) by 267 days.

(21) Appl. No.: 16/847,846

(22) Filed: Apr. 14, 2020

(65) Prior Publication Data

US 2021/0319320 A1    Oct. 14, 2021

(51) Int. Cl.
 *G06N 3/08* (2006.01)
 *G06N 3/04* (2006.01)
 *G06K 9/62* (2022.01)

(52) U.S. Cl.
 CPC .......... *G06N 3/082* (2013.01); *G06K 9/6256* (2013.01); *G06K 9/6262* (2013.01); *G06N 3/0454* (2013.01); *G06N 3/084* (2013.01)

(58) Field of Classification Search
 CPC ........ G06N 3/08; G06N 3/084; G06N 3/0454; G06N 3/04; G06N 3/082; G06N 20/00; G06K 9/6256; G06K 9/62; G06K 9/6262
 See application file for complete search history.

(56) References Cited

U.S. PATENT DOCUMENTS

2019/0108436 A1\* 4/2019 David .................. G06N 3/0454
2019/0213470 A1\* 7/2019 Schmidt ................ H04L 67/104

FOREIGN PATENT DOCUMENTS

CN           110569965          12/2019

OTHER PUBLICATIONS

Brownlee, "How to Avoid Exploding Gradients with Gradient Clipping", Feb. 6, 2019, Deep Learning Performance, 17 pages.

\* cited by examiner

*Primary Examiner* — Tuan H Nguyen
(74) *Attorney, Agent, or Firm* — Dority & Manning, P.A.

(57) ABSTRACT

Thus, aspects of the present disclosure address model "blow up" by changing the functionality of the activation, thereby providing "dead" or "dying" neurons with the ability to recover from this situation. As one example, for activation functions that have an input region in which the neuron is turned off by a 0 or close to 0 gradient, a training computing system can keep the neuron turned off when the gradient pushes the unit farther into the region (e.g., by applying an update with zero or reduced magnitude). However, if the gradient for the current training example (or batch) attempts to push the unit towards a region in which the neuron is active again, the system can allow for a non-zero gradient (e.g., by applying an update with standard or increased magnitude).

20 Claims, 10 Drawing Sheets

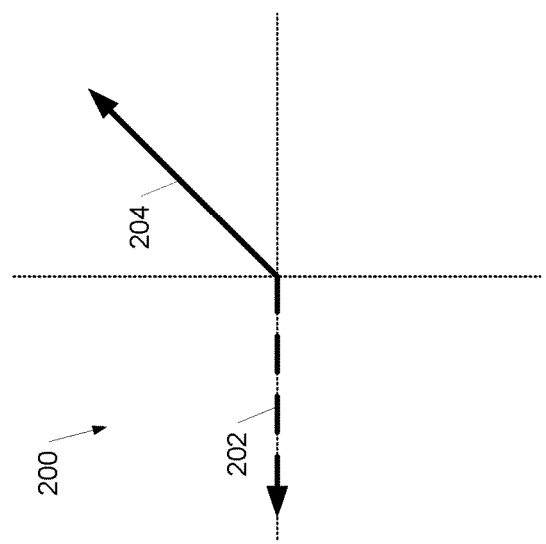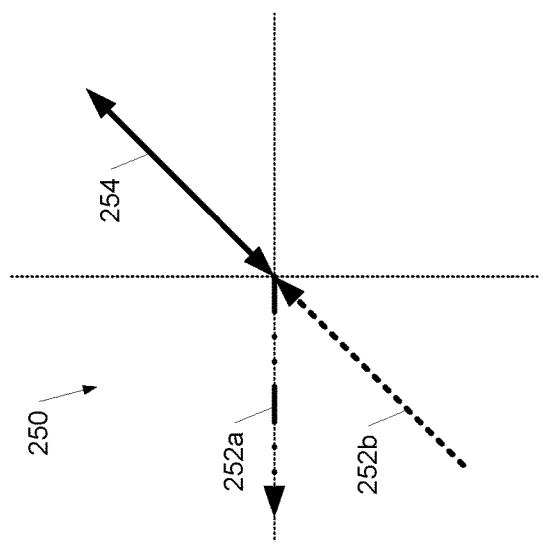

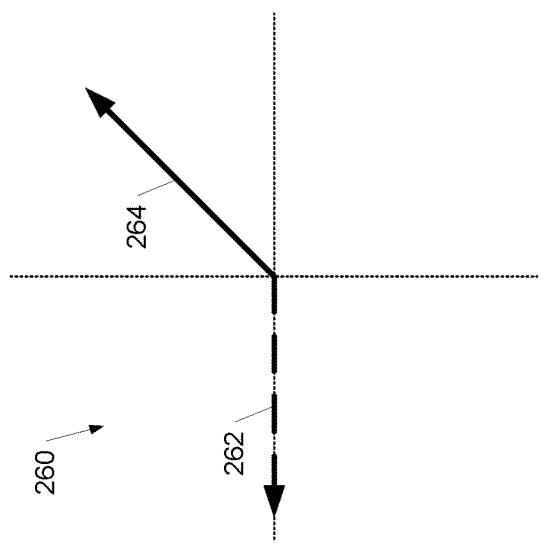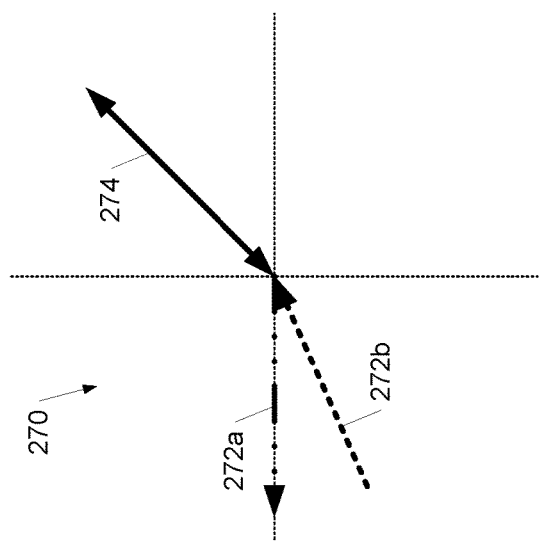

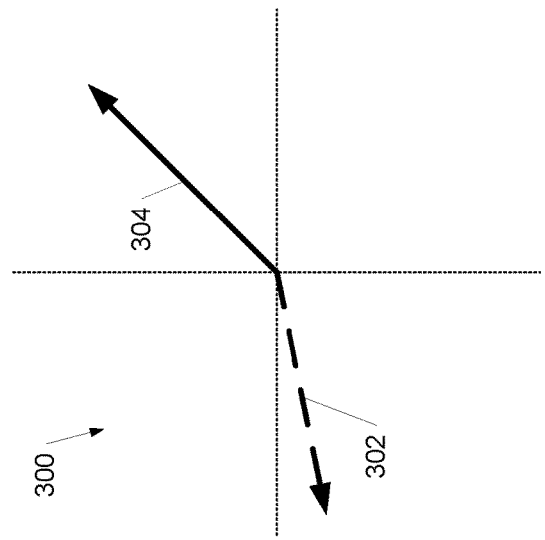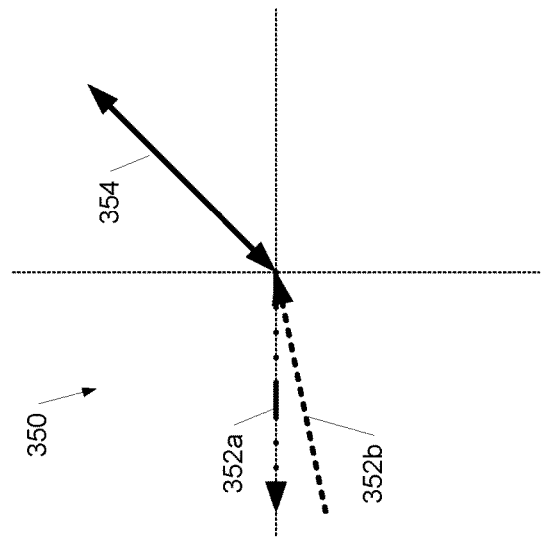

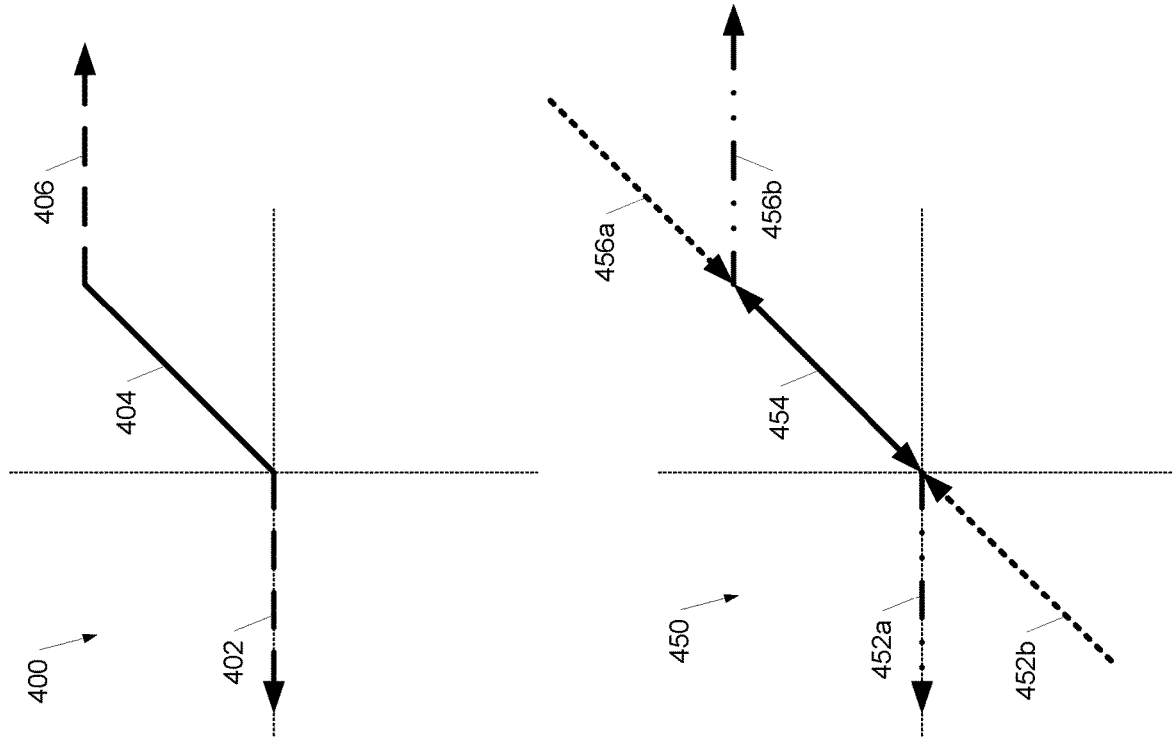

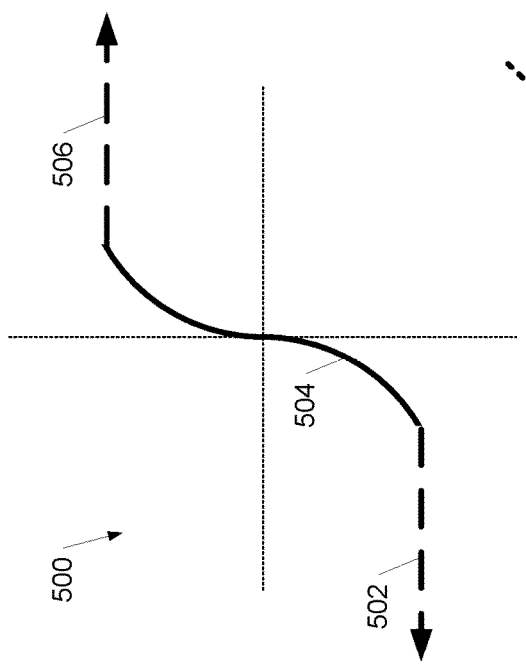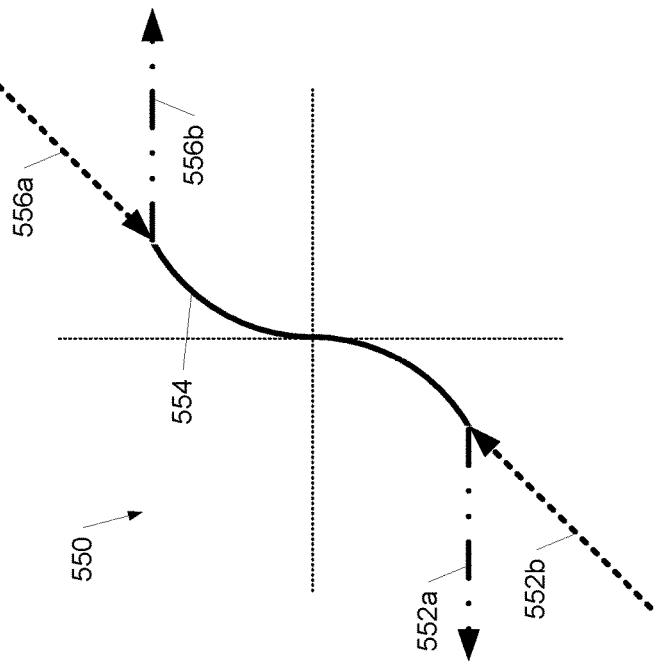

ASYMMETRIC FUNCTIONALITY ACTIVATION FOR IMPROVED STABILITY IN NEURAL NETWORKS

FIELD

The present disclosure relates generally to neural networks, and, more particularly, to asymmetric functionality activation for improved stability in neural networks.

BACKGROUND

Artificial neural networks (hereafter "neural networks"), includes a class of machine-learned models that include a group of connected neurons, which also can be referred to as nodes or perceptrons. A neural network can be organized into one or more layers. Neural networks that include multiple layers can be referred to as "deep" networks. Each neuron in a neural network can include an activation function. An activation function can define an output of a neuron given a set of inputs. Inputs to the neural network can propagate forward through the layers of neurons via the activation functions to compute the output of the neural network. In gradient-based optimization techniques, training the neural network can include backpropagating a gradient of an objective function backwards through the layers of neurons (and the activation functions thereof).

Model stability is a critical problem in training and deploying neural networks. While neural networks exhibit superior performance over other types of models for many applications, training neural networks occasionally results in divergence of the model to a highly degraded solution. Such divergence often requires re-training of the network and discarding the current model, wasting computing resources, engineering efforts, and time. Problems such as vanishing or exploding gradients have been documented in the literature, where the neural network seems to be stuck without the ability to improve its prediction performance.

An example of these problems appears in online learning, where progressive validation is used to measure the performance of the model at any given time on new data which it has not seen before. A healthy model exhibits continuous curves that converge to some level of performance relative to some baseline model (e.g., where performance is measured in terms of some standard loss function, such as logarithmic loss, ranking Area Under the Curve (AUC) loss, or other losses).

On the other hand, an unhealthy or broken model can exhibit a continuous accuracy curve but, at some point, the model can suddenly exhibit a large degradation spike relative to the same healthy baseline. Stated differently, a model which has in the past demonstrated stable performance can suddenly crash to very poor levels of performance. This can be referred to as "model blow up."

In some cases, the model can slowly recover from the large degradation spike, but in many of such cases, the recovery never reaches the performance of a healthy model that did not experience such a "blow up." In other cases, the model may not recover in any meaningful way at all. Many experiments have demonstrated that the same model with the same architecture and input features trained on the same data can successfully complete a training cycle one time, but yet blow up at another time.

Despite some of the randomness in the occurrences of the unstable behavior, there is empirical evidence that suggests that there are specific portions of the training data that are more vulnerable to such instability than others, and also there are some model architectures and configurations that on the same data set increase the chances of observing such instability. This suggests that some types of anomalies in the training data combined with some randomness that is determined by data and update ordering could be factors that exacerbate model instability.

These observations suggest that instabilities manifested as a model blow up can be in some cases caused by anomalies in the training data which lead to a model blow up pattern which evolves as follows: anomaly in training occurs; multiple large gradients in the same direction on the same training batch are formed to correct the model so it can explain the anomaly; and large gradient steps are taken on weights or other model parameters. With certain activation functions such as the ReLU activation which feature a dead region in the left domain, these steps possibly move some units to such dead domain, where the activation is turned off.

Certain learning algorithms may also exacerbate the large gradients even more when computing various statistics. For example, AdaGrad would accumulate the squares of the large gradients and use this accumulation to slow down the learning rate for future updates, limiting the ability to recover even more. Furthermore, if learning rates are not well matched between model components, some components of the model cannot adjust to the large movements in others.

Units that were pushed to the dead zone of the activation function are now stuck at 0 gradient and become dead units that, after the anomaly has ended, cannot recover to their normal state which reflects the dominating statistics of the training data. Due to dead units, the model capacity is down and part of the signal is lost. The model cannot get the dead units to recover to their states prior to the anomaly.

The model now tries to recover by using other units that were not affected to compensate. However, because the capacity of the network is reduced due to the dead units, the network cannot fully recover to the performance level before the anomaly. As such, some partial but not full recovery is often observed.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for training neural networks with improved stability. The method includes, for at least one of one or more training iterations and for each of one or more of a plurality of neurons: obtaining, by a computing system comprising one or more computing devices, a gradient of an objective function relative to the neuron, wherein the objective function evaluates a performance of a neural network that comprises the plurality of neurons; determining, by the computing system, a pre-activation value associated with a respective activation function associated with the neuron, wherein the respective activation function has one or more asymmetric update regions and a standard update region associated therewith; and determining, by the computing system, a gradient update based at least in part on the pre-activation value associated with the respective activation function and the gradient of the objective function relative to the neuron. When the pre-activation value is within one of the asymmetric update regions, the method includes: applying, by the computing system, a first update scheme to update the neuron according to the gradient update when a direction of the gradient update moves the neuron toward the standard update region; and applying, by the computing system, a second, different update scheme to update the neuron according to the gradient update when the direction of the gradient update moves the neuron away from the standard update region. The first update scheme increases a magnitude of the gradient update or the second, different update scheme decreases the magnitude of the gradient update.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIG. 2A-B depicts graphical plots of an example ReLU activation function with asymmetric functionality according to example implementations of the present disclosure.

FIG. 2C-D depicts graphical plots of an example ReLU activation function with leaky asymmetric functionality according to example implementations of the present disclosure.

FIG. 3A-B depicts graphical plots of an example leaky ReLU activation function with asymmetric functionality according to example implementations of the present disclosure.

FIG. 4A-B depicts graphical plots of an example capped ReLU activation function with asymmetric functionality according to example implementations of the present disclosure.

FIG. 5A-B depicts graphical plots of an example tanh activation function with asymmetric functionality according to example implementations of the present disclosure.

DETAILED DESCRIPTION

Overview

Figure 1:
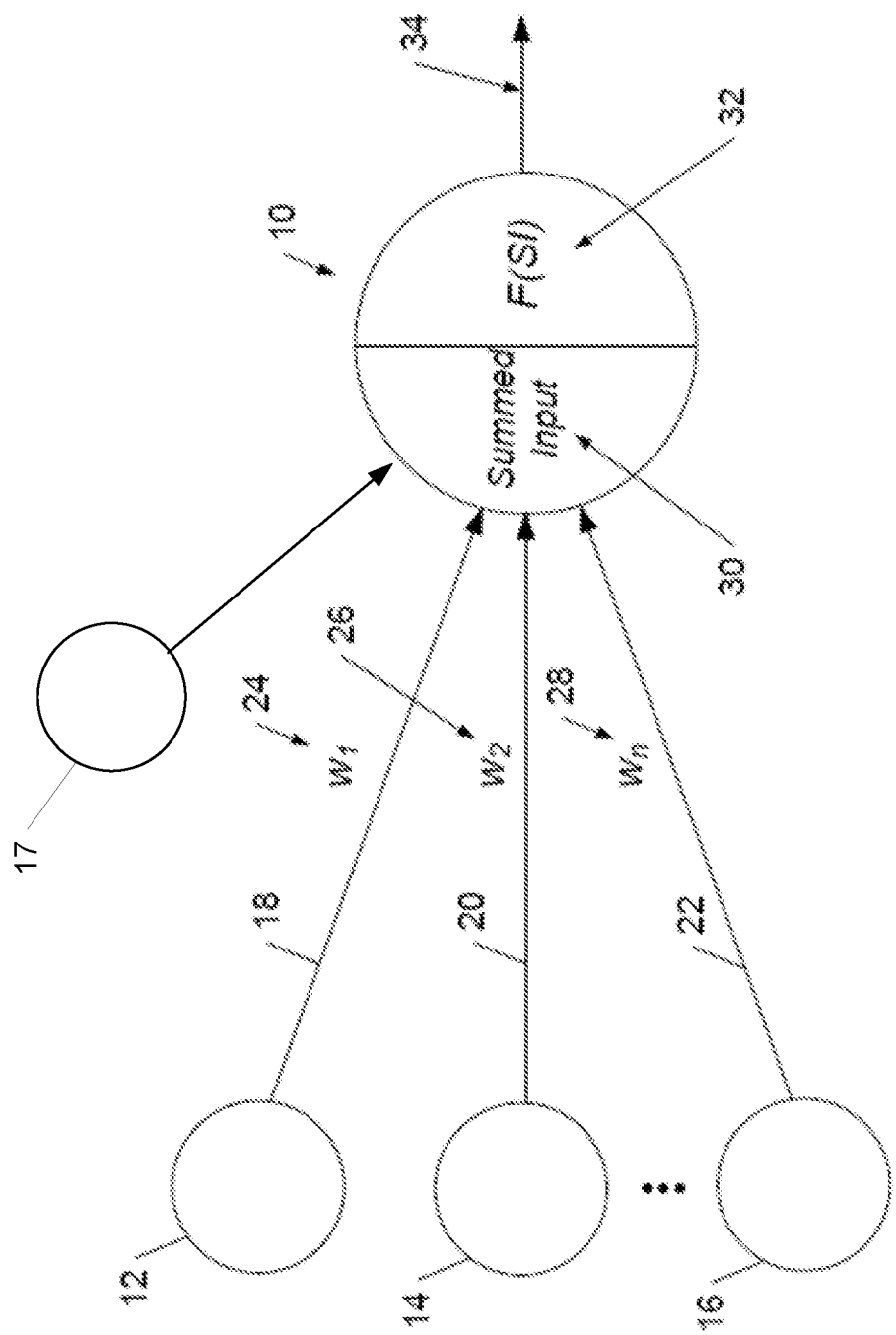
FIG. 1 depicts a graphical diagram of an example artificial neuron according to example implementations of the present disclosure.

Aspects of the present disclosure are directed to systems and methods that use activation functions that are asymmetric in their functionality to mitigate potential harmful effects of anomalies in the training data or, more generally, to allow a neural network to recover from a potential reduced capacity state from which it cannot recover with standard activations. Thus, aspects of the present disclosure enable neural networks or other machine-learned models to potentially fully recover from instances of "model blow up" and therefore provide improved stability of models, including but not limited to models that are deploying in an online learning setting.

More particularly, aspects of the present disclosure are directed to a model training scheme which implements two or more different (i.e., "asymmetric") update schemes to update the neurons of a neural network based on a current status of each neuron (e.g., whether the neuron is currently within a "dead" or other region of the activation function from which it may be challenging for the neuron to recover (e.g., regions with zero or low gradient magnitude)).

Specifically, according to an aspect of the present disclosure, an activation function of a neuron can be partitioned into two or more different regions. In some implementations, an activation function can be defined to include one or more asymmetric update regions and a standard update region. For example, the asymmetric update region(s) can be regions where neurons become inoperative (e.g., routinely output only zero value); regions that have a gradient of zero or some other relatively small value (e.g., less than some threshold value); and/or regions that are outside a desired operating range for the neurons. Thus, in some examples, an asymmetric update region can correspond to regions of the activation function which have a gradient of zero or close to zero, which can result in a neuron becoming "stuck" in such region. By contrast, the standard update region can correspond to a region that includes the desired operating range for the neuron and/or that has a gradient with magnitude greater than some threshold value.

During training of the model based on training data, each neuron can be updated (e.g., its weight(s), bias(es), or other parameters modified) according to different update schemes. For example, if a neuron is currently within the standard update region, the neuron can be updated according to standard techniques. However, if the neuron is currently within an asymmetric update region of the activation function, two or more different update schemes can be applied depending on a direction of the gradient update determined for the neuron.

Specifically, for neurons that are currently within an asymmetric update region (e.g., a "dead" or other challenging region) of the activation function, gradient updates which will work to move the neuron out of the region (e.g., toward a standard update region of the activation function) can be applied according to a first update scheme. In particular, the first update scheme can give full or increased effect to the gradient update. However, gradient updates which will work to move the neuron further into the region (e.g., away a standard update region of the activation function) can be applied according to a second, different update scheme. For example, the second update scheme can give zero or reduced effect to the gradient update.

In such fashion, gradient updates which enable the neuron to escape the asymmetric update region (e.g., a "dead" or other challenging region) of the activation function can be applied with full or increased weight while gradient updates which would cause the neuron to move farther into the asymmetric update region can be applied with reduced or zero weight. To provide one example, for a Rectified Linear Unit ("ReLU") activation function, the asymmetric functionality proposed herein allows a neuron in the left-side dead region to recover from a zero activation with a non-zero right gradient, while maintaining a zero left gradient to prevent the neuron from moving further into the dead region.

Asymmetric updating schemes for activation functions according to example aspects of the present disclosure can achieve a number of technical effects and benefits. For example, asymmetric updating for activation functions as described herein can achieve improved model stability or, stated differently, can reduce, eliminate, and/or ameliorate the occurrence of model "blow ups." By improving model stability, the number of times a model will need to be significantly re-trained can be reduced. For example, it is often the case that when model blow ups occur, the entire model will need to be completely re-initialized and re-trained. As such, by reducing the effects of model blow up, the total number of training iterations that need to be performed to achieve desired performance by the models can be significantly reduced. This results in conserving computing resources such as processor usage, memory usage, and/or network bandwidth usage.

As another example technical effect, asymmetric updating for activation functions as described herein can achieve improved model stability, which corresponds to improved performance of the model over time. For example, model blow ups often result in a severe degradation of model performance. By reducing the effects of model blow up, the average performance of the model over time can be improved. Thus, the techniques described herein can directly improve model performance in the aggregate.

As another example technical effect, asymmetric updating for activation functions as described herein can enable faster training of a machine-learned model. For example, by enabling improved ability for neurons to escape a "dead" or "dying" region (e.g., via enhancing or amplifying gradient updates which move neurons out of such region), the systems and methods described herein can enable a model to more quickly converge to a high-performing solution. Faster training can result in conserving computing resources such as processor usage, memory usage, and/or network bandwidth usage.

As another example technical effect, asymmetric updating for activation functions as described herein can enable models which are more expressive and/or robust. For example, for typical update schemes, certain neurons can become "dead" or "stuck" in a state in which they do not contribute to the functionality or performance of the network. This results in a network with reduced capacity and therefore reduced expressiveness. By enabling neurons to avoid becoming "dead" or "stuck" in a state that is not useful, the systems and methods described herein can enable the network to continue operating at full capacity, expressiveness, and robustness.

Neural networks or other machine-learned models that include, perform, and/or are trained or updated according to the asymmetric techniques described herein can be used for any number of different use cases or applications. As one example, asymmetrically-updated models can be used to process an input to generate a prediction for the input. The input can be an image input, an audio input, a text input, a feature vector input with arbitrary features, and/or other forms of inputs. The prediction can be, for example, a classification prediction, a regression prediction, a detection prediction, a recognition prediction, a segmentation prediction, and/or other forms of predictions.

The example asymmetric activation functions and/or asymmetric updating for activation functions described herein can be implemented in software, hardware, and/or firmware. As one example, the example asymmetric activation functions and/or asymmetric updating for activation functions described herein can be implemented using an application specific integrated circuit. As another example, the example asymmetric activation functions and/or asymmetric updating for activation functions described herein can be implemented in a fixed electrically and/or biologically-implemented circuit.

With reference now to the figures, example aspects of the present disclosure will be described in further detail.

Example Neuron

FIG. 1 provides a graphical diagram of an example artificial neuron 10. The artificial neuron 10 can be connected to one or more presynaptic neurons 12, 14, 16. The artificial neuron 10 can be connected to the presynaptic neurons 12, 14, 16 via artificial synapses 18, 20, 22. The presynaptic neurons 12, 14, 16 can pass presynaptic neuron outputs to the artificial neuron 10 via the artificial synapses 18, 20, 22. A bias 17 can also be provided to the artificial neuron 10.

Each synapse 18, 20, 22 can have an adjustable weight 24, 26, 28 (e.g., scalar weight) associated therewith. The weights 24, 26, 28 can be changed as a result of learning. Each artificial synapse 18, 20, 22 can be either excitatory (e.g., have a positive-valued weight), which increases the summed input of the receiving neuron 10 upon receipt, or inhibitory (e.g., have a negative-valued weight), which decreases the summed input of the receiving neuron 10 upon receipt. In some implementations, the summed input 30 can also be referred to as "pre-activation value" of the neuron 10.

The artificial neuron 10 can also have an activation function 32, which controls the output 34 of the neuron 10 based on the summed input 30. In particular, the activation function 32 can be any of the proposed activation functions described herein (e.g., a smooth piece-wise continuous activation function). Use of an activation function 32 as described herein can improve reproducibility without sacrificing accuracy.

Although not explicitly shown in FIG. 1, various other parameters can impact the behavior of the artificial neuron 10 such as, for example, bias parameter(s), and/or the like.

Example Asymmetric Activation Function Update Schemes

Aspects of the present disclosure address model "blow up" or otherwise provide improved model stability by changing the functionality of the activation at certain regions. This can provide "dead" or "dying" neurons with the ability to recover from this situation. As one example, for activation functions that have an input region in which the neuron is turned off by a 0 or close to 0 gradient, a training computing system can keep the neuron turned off when the gradient for the current training example (or batch) pushes the unit farther into the region (e.g., by applying an update with zero or reduced magnitude). However, if the gradient for the current training example (or batch) attempts to push the unit towards a region in which the neuron is active again, the system can allow for a non-zero gradient (e.g., by applying an update with standard or increased magnitude).

FIGS. 2A-5B show example activation functions with asymmetric functionality. The illustrated activation functions are given as examples only. Different activation functions than the illustrated functions can be used to implement the principles described herein. The particular slopes, origin crossings, or other mathematical characteristics given for various illustrated plots are provided as examples only; other values can optionally be used.

Example Application to Rectified Linear Unit

FIGS. 2A-B show the asymmetric functionality described herein as applied to an example Rectified Linear Unit (ReLU) activation function. FIG. 2A shows an example ReLU activation function 200.

According to an aspect of the present disclosure, two or more regions can be defined within the activation function 200. In this specific example, two regions have been defined in the ReLU activation function 200. Specifically, a first region 202 extends from the origin leftward while a second region 204 extends from the origin rightward. The first region 202 can in some instances be referred to as a "left-hand region" or a "dead region." Both the output and the gradient of function 200 in the first region 202 are 0. In the second region 204 the output is an identity while the gradient is equal to 1.

Each region within the ReLU activation function 200 can be designated as a standard update region or an asymmetric update region. In this specific example, the first region 202 has been designated as an asymmetric update region while the second region 204 has been designated as a standard update region. When a pre-activation value of the neuron is within the second region 204, standard updating can be performed. However, when the pre-activation value of the neuron is within the first region 202, two different update schemes can be applied Specifically, referring now to both FIGS. 2A and 2B, FIG. 2B shows a conceptual plotting of a ReLU activation function 250 with asymmetric updating in the left-hand region which corresponds to the first region 202 of FIG. 2A. In particular, for pre-activation values that fall within region 202 of FIG. 2A, if the direction of the gradient update is leftward away from the standard update region 204, then the gradient update can be multiplied by or set equal to zero, as shown by leftward pointing plot 252a of FIG. 2B with gradient equal to 0. However, for pre-activation values that fall within region 202 of FIG. 2A, if the direction of the gradient update is rightward toward the standard update region 204, then the gradient update can be multiplied by or set equal to some non-zero value, as shown by the rightward pointing plot 252b with gradient equal to 1.

For pre-activation values that fall within the second region 204 of FIG. 2A, the gradient update can be treated using standard update schemes, as shown in plot 254 of FIG. 2B with gradient equal to 1.

In this manner, if the back-propagated gradient update for an activation with a negative valued pre-activation is positive, the same positive value will be propagated to the neuron pre-activation. This is unlike the normal ReLU activation, which will set the gradient propagated to the pre-activated neuron to 0. If the gradient update propagated to the post-activated neuron is negative, the behavior will be the same as the standard ReLU, and a 0 gradient will be propagated to the pre-activated neuron.

One way to view the proposed asymmetry illustrated in FIGS. 2A and 2B is as follows. The region right of the origin of the activation function has a linear response like a normal ReLU. The region to the left of the origin, however, is mapped into a single point 0—with discontinuity in the gradient, for which the left gradient is 0, and the right gradient is 1. (Note that the gradients here and the rest of the document are those on the negative loss and apply to direction in which the unit moves at the update that follows seeing a training example).

Thus, for a neuron currently within the left hand region, example implementations of the proposed method apply the gradients only when a gradient update follows the correct direction towards recovery from a dead unit. When the gradient attempts to push the unit even farther to the dead region, gradient updates are not applied to the unit, keeping it where it is, but not making it harder to recover the unit. This approach will allow a dead unit to recover when the model needs to move in the recovery direction but will have no effect if the unit is to be pushed even more towards the dead region.

To provide an example, imagine that a single example has pushed the unit such that it became dead. If another subsequent example with the same level that would push the unit in the same direction is observed, that example will not cause any change to the unit. Alternatively, if an example tries to push the unit back to recovery, then it wouldn't be able to with normal ReLU functionality but will be able to with the proposed asymmetric functionality. This reasoning can justify viewing the dead region of the ReLU as if any point in this dead region has a non-continuous gradient. If the gradient pushes towards the recovery it can be positive (and optionally amplified), but if it pushes in the opposite direction, it can be reduced or set to 0. This reasoning can be followed for this methodology.

Example Application to Leaky Versions

The methodology described with reference to FIGS. 2A and 2B can be modified to provide leaky asymmetry for a ReLU activation, as shown in FIGS. 2C and 2D. FIG. 2C shows an example ReLU activation function 260.

According to an aspect of the present disclosure, two or more regions can be defined within the activation function 260. In this specific example, two regions have been defined in the ReLU activation function 260. Specifically, a first region 262 extends from the origin leftward while a second region 264 extends from the origin rightward. The first region 262 can in some instances be referred to as a "left-hand region" or a "dead region." Both the output and the gradient of function 262 in the first region 262 are 0. In the second region 264 the output is an identity while the gradient is equal to 1.

Each region within the ReLU activation function 260 can be designated as a standard update region or an asymmetric update region. In this specific example, the first region 262 has been designated as an asymmetric update region while the second region 264 has been designated as a standard update region. When a pre-activation value of the neuron is within the second region 264, standard updating can be performed. However, when the pre-activation value of the neuron is within the first region 262, two different update schemes can be applied Specifically, referring now to both FIGS. 2C and 2D, FIG. 2D shows a conceptual plotting of a ReLU activation function 270 with asymmetric updating in the left-hand region which corresponds to the first region 262 of FIG. 2A. In particular, for pre-activation values that fall within region 262 of FIG. 2C, if the direction of the gradient update is leftward away from the standard update region 264, then the gradient update can be multiplied by or set equal to zero, as shown by leftward pointing plot 272a of FIG. 2D with gradient equal to 0. However, for pre-activation values that fall within region 262 of FIG. 2C, if the direction of the gradient update is rightward toward the standard update region 264, then the gradient update can be multiplied by or set equal to some non-zero value such as a leaky gradient, as shown by the rightward pointing plot 272b with gradient equal to some positive number less than 1 (e.g., 0.3).

For pre-activation values that fall within the second region 264 of FIG. 2C, the gradient update can be treated using standard update schemes, as shown in plot 274 of FIG. 2D with gradient equal to 1.

The methodology described with reference to FIGS. 2A and 2B can also be generalized to provide a leaky ReLU activation function with asymmetric functionality as shown in FIGS. 3A and 3B.

Specifically, in FIG. 3A, a leaky ReLU activation function 300 includes a first region 302 and a second region 304. The first region 302 has a slope that is less than 1 (e.g., 0.3) while the second region 304 has a slope equal to 1. In the illustrated example, the first region 302 has been designated as an asymmetric update region while the second region 304 has been designated as a standard update region.

As such, referring to FIGS. 3A and 3B together, if a pre-activation value of a neuron is within the first region 302 of FIG. 3A and the direction of the gradient update is leftward away from region 304, then the gradient update can be multiplied by or set equal to zero, as shown by leftward pointing plot 352a of FIG. 3B with gradient equal to 0. However, for pre-activation values that fall within region 302 of FIG. 3A, if the direction of the gradient update is rightward toward the standard update region 304, then the gradient update can be multiplied by or set equal to some non-zero value, as shown by the rightward pointing plot 252b with gradient equal to 0.3. Thus, for leaky asymmetry, smaller slopes can be used to still allow for unit recovery in the proper directions, but giving it smaller magnitude.

For pre-activation values that fall within the second region 304 of FIG. 3A, the gradient update can be treated using standard update schemes, as shown in plot 354 of FIG. 3B with gradient equal to 1.

Example Application to Clipped Activations

In many situations, the activation values are also capped or clipped at some positive and/or negative value(s), due to implementation constraints (e.g., including hardware fixed point limitations) and/or numerical stability. If the underlying activation is ReLU, the actual deployed activation becomes a capped ReLU as shown in FIG. 4A, which includes a first region 402, a second region 404, and a third region 406. This capped activation enhances the problem of possible lack of recovery not only for the negative region 402 of the pre-activation value but also to the third region 406 over the activation cap. In particular, the gradients in the over-capped region 406 become zero, whether the unit attempts to increase its pre-activation value or it attempts to decrease it. Increasing the pre-activation value can be limited because of the constraints but recovering the value towards the uncapped region can be allowed.

As such, in some implementations, each of regions 402 and 406 can be designated as asymmetric update regions while region 404 is a standard update region.

In particular, referring to FIGS. 4A and 4B together, if a pre-activation value of a neuron is within the first region 402 of FIG. 4A and the direction of the gradient update is leftward away from region 404, then the gradient update can be multiplied by or set equal to zero, as shown by leftward pointing plot 452a of FIG. 4B with gradient equal to 0. However, for pre-activation values that fall within region 402 of FIG. 4A, if the direction of the gradient update is rightward toward the standard update region 404, then the gradient update can be multiplied by or set equal to some non-zero value, as shown by the rightward pointing plot 452b with gradient equal to 1.

Likewise, if a pre-activation value of a neuron is within the third region 406 of FIG. 4A and the direction of the gradient update is rightward away from region 404, then the gradient update can be multiplied by or set equal to zero, as shown by rightward pointing plot 456b of FIG. 4B with gradient equal to 0. However, for pre-activation values that fall within region 406 of FIG. 4A, if the direction of the gradient update is leftward toward the standard update region 404, then the gradient update can be multiplied by or set equal to some non-zero value, as shown by the leftward pointing plot 456a with a gradient update equal to −1.

For pre-activation values that fall within the second region 404 of FIG. 4A, the gradient update can be treated using standard update schemes, as shown in plot 454 of FIG. 4B with gradient equal to 1.

Thus, the asymmetric functionality proposed herein can be applied at the upper capped region 406 as well, but in the opposite direction. The right gradient, this time, can be kept at 0, while the left gradient (on the negative loss) can become −1, and follow the dashed line shown at 456a. If the post-activation backpropagated gradient is negative it can be fully passed to the pre-activation value, while a positive gradient can be blocked and set to 0.

Another reasoning for the approach described that applies more to this case (e.g., where the clipping is at the extreme end of the range) can be the behavior of logistic regression. If we are at the extreme point at one end in logodds, say the negative end, a negative label at that direction would result in a small gradient. A positive label, on the other hand, would result in a large gradient. One can view a dead-unit as if it is at the extreme. A label that pushes more towards the dead unit leads to a small harmless insignificant gradient, whereas a label that pushes towards recovery would result in a large significant gradient that should not be omitted, and accounts to a rare example. If we don't take the harmless small step, there is no big harm to the model, but if we don't take the large rare step, the model degrades. With standard ReLU, a unit can be pushed to the dead region after seeing many similar examples, but then may not be able to recover when a rare example is observed.

Another example form of clipped activation is that of a HardTanH, where a linear curve is clipped symmetrically at some magnitude in both the positive and negative ends. Here, again, this method will apply the gradients toward the origin in the region outside the clipping, and 0 the gradients that push the updates away from the origin in both extremes.

In particular, FIG. 5A shows an example HardTanH function which includes a first region 502, a second region 504 that spans the origin, and a third region 506. In some implementations, each of regions 502 and 506 can be designated as asymmetric update regions while region 504 is a standard update region.

In particular, referring to FIGS. 5A and 5B together, if a pre-activation value of a neuron is within the first region 502 of FIG. 5A and the direction of the gradient update is leftward away from region 504, then the gradient update can be multiplied by or set equal to zero, as shown by leftward pointing plot 552a of FIG. 5B with gradient equal to 0. However, for pre-activation values that fall within region 502 of FIG. 5A, if the direction of the gradient update is rightward toward the standard update region 504, then the gradient update can be multiplied by or set equal to some non-zero value, as shown by the rightward pointing plot 552b with gradient equal to 1.

Likewise, if a pre-activation value of a neuron is within the third region 506 of FIG. 5A and the direction of the gradient update is rightward away from region 504, then the gradient update can be multiplied by or set equal to zero, as shown by rightward pointing plot 556b of FIG. 5B with gradient equal to 0. However, for pre-activation values that fall within region 506 of FIG. 5A, if the direction of the gradient update is leftward toward the standard update region 504, then the gradient update can be multiplied by or set equal to some non-zero value, as shown by the leftward pointing plot 556a with gradient equal to −1.

For pre-activation values that fall within the second region 504 of FIG. 5A, the gradient update can be treated using standard update schemes, as shown in plot 554 of FIG. 5B with unamended gradient.

Example Devices and Systems

Figure 6A:
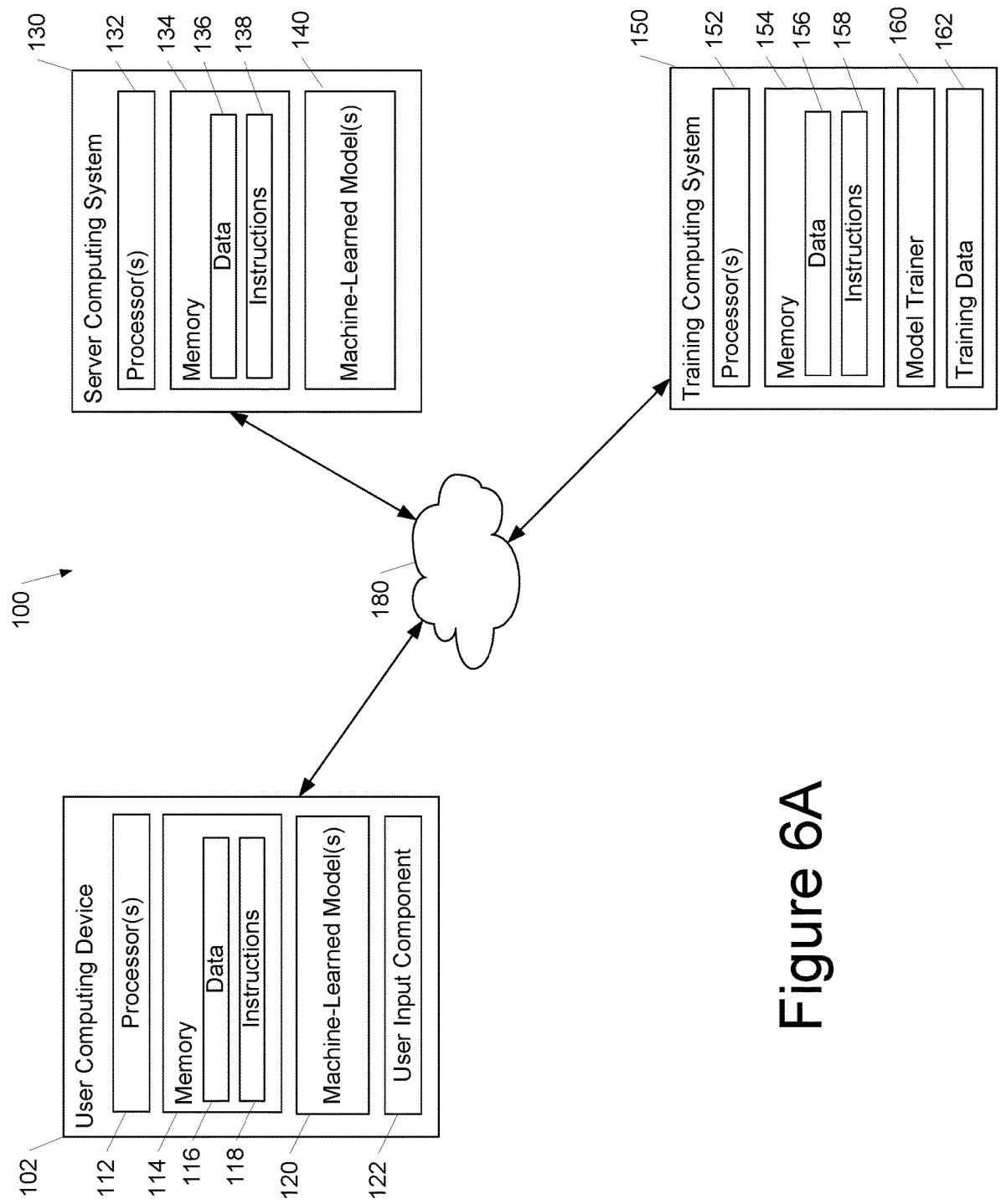
FIG. 6A depicts a block diagram of an example computing system that can implement machine-learned models according to example implementations of the present disclosure.

FIG. 6A depicts a block diagram of an example computing system 100 that can implement machine-learned models according to example implementations of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more neural network models 120. For example, the neural network models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example neural network models 120 are discussed with reference to FIGS. 1-5B.

In some implementations, the one or more neural network models 120 can be received from the server computing system 130 over network 180, stored in the user computing device memory 114, and then used or otherwise implemented by the one or more processors 112. In some implementations, the user computing device 102 can implement multiple parallel instances of a single neural network model 120.

Additionally or alternatively, one or more neural network models 140 can be included in or otherwise stored and implemented by the server computing system 130 that communicates with the user computing device 102 according to a client-server relationship. For example, the neural network models 140 can be implemented by the server computing system 140 as a portion of a service (e.g., a web service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned neural network models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. The model trainer 160 can apply any of the asymmetric update techniques described herein.

In some implementations, performing backwards propagation of errors can include performing truncated back-propagation through time. The model trainer 160 can perform a number of generalization techniques (e.g., weight decays, dropouts, etc.) to improve the generalization capability of the models being trained. In particular, the model trainer 160 can train the neural network models 120 and/or 140 based on a set of training data 162.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 6A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 6B:
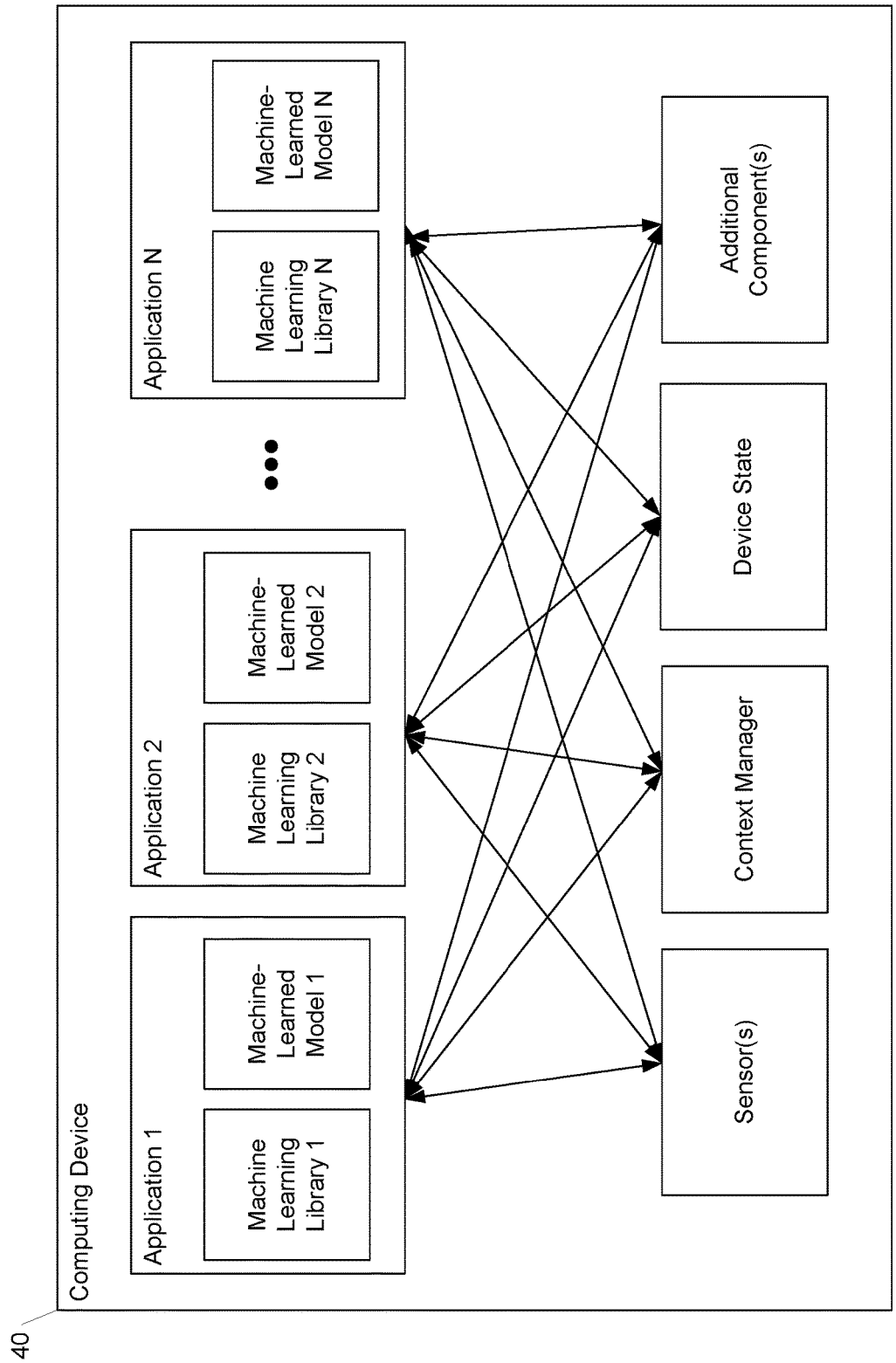
FIG. 6B depicts a block diagram of an example computing device that can implement machine-learned models according to example implementations of the present disclosure.

FIG. 6B depicts a block diagram of an example computing device 40 that can implement machine-learned models according to example implementations of the present disclosure. The computing device 40 can be a user computing device or a server computing device.

The computing device 40 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
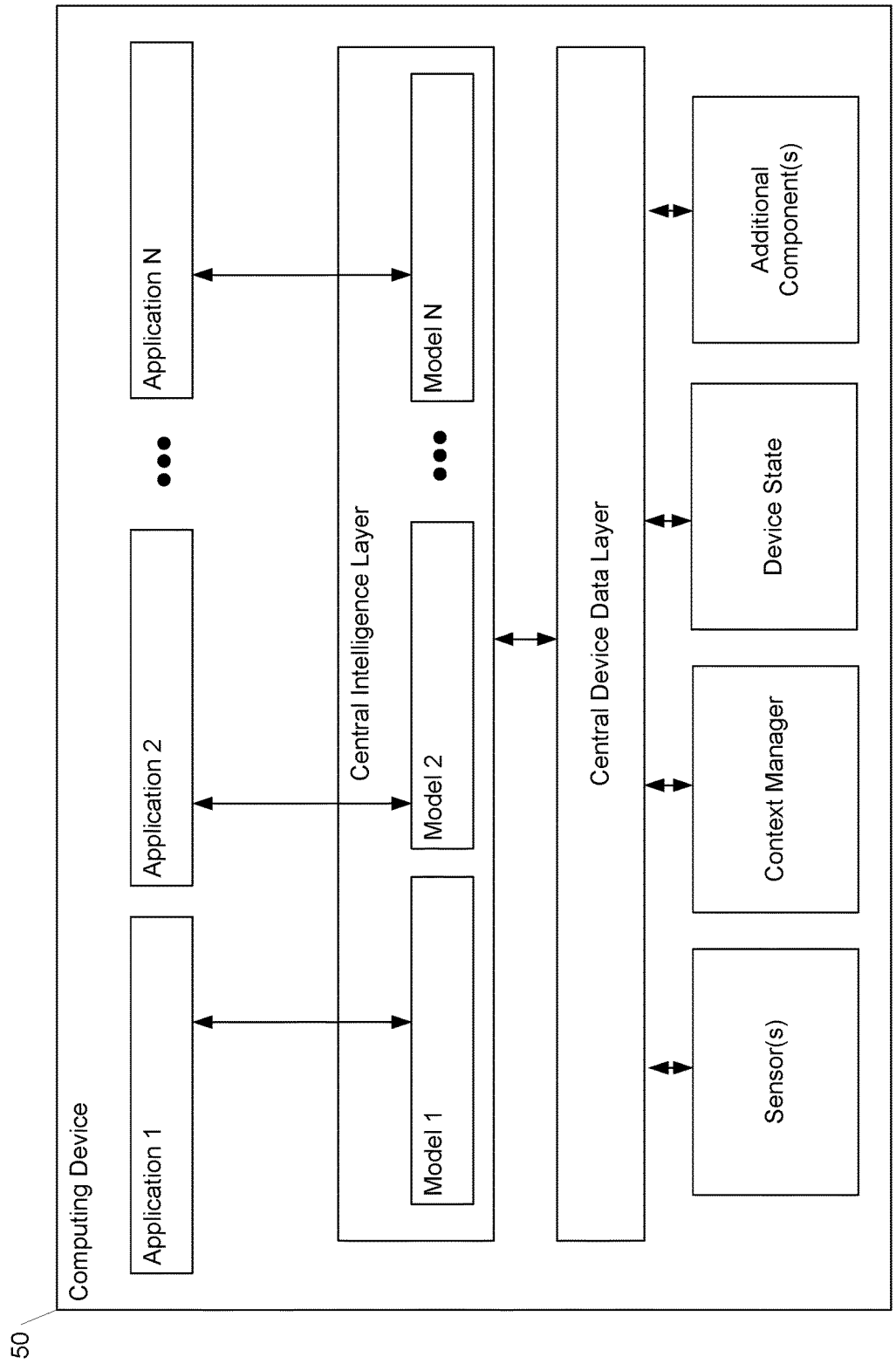
FIG. 6C depicts a block diagram of an example computing device that can implement machine-learned models according to example implementations of the present disclosure.

FIG. 6C depicts a block diagram of an example computing device 50 according to example implementations of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 7:
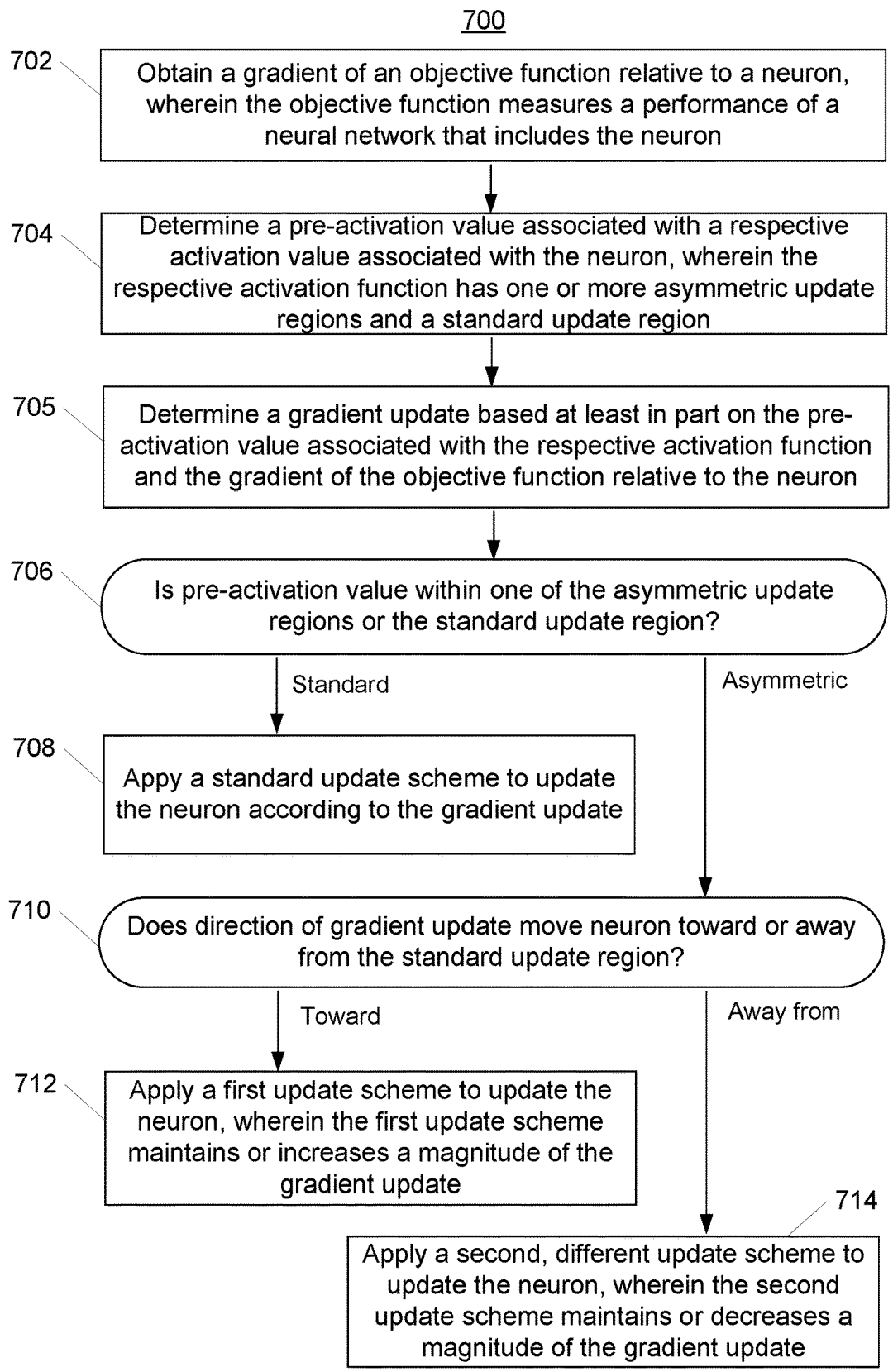
FIG. 7 depicts a flow chart diagram of an example method to train a neural network with improved stability according to example implementations of the present disclosure.

FIG. 7 depicts a flow chart diagram of an example method 700 to train a neural network with improved stability according to example implementations of the present disclosure. In some implementations, the method 700 can be respectively performed individually for some or all of the neurons in a neural network. In some implementations, method 700 can be performed at each of a number of distinct training iterations. In some implementations, method 700 can be performed on the basis of a gradient update determined from a single training example. In other implementations, method 700 can be performed on the basis of a gradient update determined from multiple training examples in aggregate (e.g., a gradient update across a batch of training examples).

At 702, method 700 can include obtaining, by a computing system comprising one or more computing devices, a gradient of an objective function relative to the neuron. The objective function can evaluate a performance of a neural network that comprises the plurality of neurons.

In some implementations, the gradient comprises a single gradient with respect to a single training example. In other implementations, the gradient comprises an average gradient with respect to a batch of a plurality of training examples.

At 704, method 700 can include determining, by the computing system, a pre-activation value associated with a respective activation function associated with the neuron. The respective activation function can have one or more asymmetric update regions and a standard update region associated therewith.

In some implementations, the activation function has a dying asymmetric update region of the one or more asymmetric update regions to the left of an origin and the standard update region to the right of the origin.

In some implementations, the activation function comprises a rectified linear unit (ReLU) function or a leaky ReLU function.

In some implementations, the activation function has the standard update region for pre-activation values spanning from an origin to certain positive value and a clipped asymmetric update region of the one or more asymmetric update regions for pre-activation values greater than the certain positive value.

In some implementations, the activation function comprises a hard hyperbolic tangent activation function with upper and lower clipped regions, and wherein the one or more asymmetric update regions comprise upper and lower asymmetric update regions that correspond to the upper and lower clipped regions of the hard tanh activation function.

In some implementations, the one or more asymmetric update regions correspond to regions of the activation function that have zero gradient.

At 705, method 700 can include determining, by the computing system, a gradient update based at least in part on the pre-activation value associated with the respective activation function and the gradient of the objective function relative to the neuron.

In some implementations, the gradient update comprises a single gradient update with respect to a single training example. In other implementations, the gradient update comprises an average gradient update with respect to a batch of a plurality of training examples.

At 706, method 700 can include determining whether the pre-activation value within one of the asymmetric update regions or the standard update region. If the pre-activation value is within the standard update region, then method 700 can proceed to 708 and apply a standard update scheme to update the neuron according to the gradient update.

However, if it is determined at 706 that the pre-activation value is within an asymmetric update region, then method 700 can proceed to 710. At 710, method 700 can include determining whether the direction of the gradient update moves the neuron toward or away from the standard update region. If it is determined at 710 that the direction of the gradient update moves the neuron toward the standard update region then the method 700 can proceed to 712. However, if it is determined at 710 that the direction of the gradient update moves the neuron away from the standard update region then the method 700 can proceed to 714.

At 712, method 700 can include applying, by the computing system, a first update scheme to update the neuron according to the gradient update. The first update scheme can maintain or increase a magnitude of the gradient update.

At 714, method 700 can include applying, by the computing system, a second, different update scheme to update the neuron according to the gradient update. The second update scheme can maintain or decrease a magnitude of the gradient update.

In some implementations, the first update scheme comprises multiplying the gradient update by a first scalar value and the second, different update scheme comprises multiplying the gradient update by a second scalar value that is less than the first scalar value.

In some implementations, the first scalar value comprises a positive scalar value and the second scalar value comprises zero. In some implementations, the first scalar value comprises 1. In some implementations, the first scalar value comprises a positive value less than 1.

In some implementations, applying, by the computing system, the first update scheme or the second update scheme to update the neuron according to the gradient update comprises backpropagating, by the computing system, the gradient through the neuron with the magnitude of the gradient update as modified by application of the first or second update scheme.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training neural networks with improved stability, the method comprising:
    for at least one of one or more training iterations:
        for each of one or more of a plurality of neurons:
            obtaining, by a computing system comprising one or more computing devices, a gradient of an objective function relative to the neuron, wherein the objective function evaluates a performance of a neural network that comprises the plurality of neurons;
            determining, by the computing system, a pre-activation value associated with a respective activation function associated with the neuron, wherein the respective activation function has one or more asymmetric update regions and a standard update region associated therewith;

determining, by the computing system, a gradient update based at least in part on the pre-activation value associated with the respective activation function and the gradient of the objective function relative to the neuron; and when the pre-activation value is within one of the asymmetric update regions:

applying, by the computing system, a first update scheme to update the neuron according to the gradient update when a direction of the gradient update moves the neuron toward the standard update region; and applying, by the computing system, a second, different update scheme to update the neuron according to the gradient update when the direction of the gradient update moves the neuron away from the standard update region;

wherein the first update scheme increases a magnitude of the gradient update or the second, different update scheme decreases the magnitude of the gradient update.

2. The computer-implemented method of claim 1, wherein:

the first update scheme comprises multiplying the gradient update by a first scalar value; and the second, different update scheme comprises multiplying the gradient update by a second scalar value that is less than the first scalar value.

3. The computer-implemented method of claim 2, wherein:

the first scalar value comprises a positive scalar value; and
the second scalar value comprises zero.

4. The computer-implemented method of claim 3, wherein:

the first scalar value comprises 1.

5. The computer-implemented method of claim 3, wherein:

the first scalar value comprises a positive value less than 1.

6. The computer-implemented method of claim 1, wherein the activation function has a dying asymmetric update region of the one or more asymmetric update regions to the left of an origin and the standard update region to the right of the origin.

7. The computer-implemented method of claim 6, wherein the activation function comprises a rectified linear unit (ReLU) function or a leaky ReLU function.

8. The computer-implemented method of claim 1, wherein the activation function has the standard update region for pre-activation values spanning from an origin to certain positive value and a clipped asymmetric update region of the one or more asymmetric update regions for pre-activation values greater than the certain positive value.

9. The computer-implemented method of claim 1, wherein the activation function comprises a hard hyperbolic tangent activation function with upper and lower clipped regions, and wherein the one or more asymmetric update regions comprise upper and lower asymmetric update regions that correspond to the upper and lower clipped regions of the hard tanh activation function.

10. The computer-implemented method of claim 1, wherein the one or more asymmetric update regions correspond to regions of the activation function that have zero gradient.

11. The computer-implemented method of claim 1, wherein applying, by the computing system, the first update scheme or the second update scheme to update the neuron according to the gradient update comprises backpropagating, by the computing system, the gradient through the neuron with the magnitude of the gradient update as modified by application of the first or second update scheme.

12. The computer-implemented method of claim 1, further comprising:

when the pre-activation value is within the standard update region:

applying, by the computing system, a standard update scheme to update the neuron according to the gradient update irrespective of the direction of the gradient update.

13. The computer-implemented method of claim 1, wherein the gradient update comprises a single gradient update with respect to a single training example.

14. The computer-implemented method of claim 1, wherein the gradient update comprises an average gradient update with respect to a batch of a plurality of training examples.

15. A computing system, comprising:

one or more processors; and one or more non-transitory computer-readable media that store instructions that, when executed by the one or more processors cause the computing system to perform operations to train a neural network that comprises a plurality of neurons, the operations comprising:

for at least one of one or more training iterations:

for each of one or more of a plurality of neurons:

obtaining, by the computing system, a gradient of an objective function relative to the neuron, wherein the objective function evaluates a performance of the neural network;

determining, by the computing system, a pre-activation value associated with a respective activation function associated with the neuron, wherein the respective activation function comprises a ReLU function or a leaky ReLU function, and wherein the respective activation function comprises a dying asymmetric update region to the left of an origin and a standard update region to the right of the origin;

determining, by the computing system, a gradient update based at least in part on the pre-activation value associated with the respective activation function and the gradient of the objective function relative to the neuron; and when the pre-activation value is within the dying asymmetric update region:

applying, by the computing system, a first update scheme to update the neuron according to the gradient update when a direction of the gradient update moves the neuron toward the origin; and applying, by the computing system, a second, different update scheme to update the neuron according to the gradient update when the direction of the gradient update moves the neuron away from the origin;

wherein the first update scheme increases a magnitude of the gradient update or the second, different update scheme decreases the magnitude of the gradient update.

16. The computing system of claim 15, wherein:
the first update scheme comprises multiplying the gradient update by a first scalar value; and
the second, different update scheme comprises multiplying the gradient update by a second scalar value that is less than the first scalar value.

17. The computer-implemented method of claim 16, wherein:
the first scalar value comprises a positive scalar value; and
the second scalar value comprises zero.

18. The computer-implemented method of claim 17, wherein:
the first scalar value comprises 1.

19. The computer-implemented method of claim 17, wherein:
the first scalar value comprises a positive value less than 1.

20. One or more non-transitory computer-readable media that collectively store a neural network that has been according to a training method, the training method comprising:
for at least one of one or more training iterations:
for each of one or more of a plurality of neurons:
obtaining, by a computing system comprising one or more computing devices, a gradient of an objective function relative to the neuron, wherein the objective function evaluates a performance of the neural network that comprises the plurality of neurons;
determining, by the computing system, a pre-activation value associated with a respective activation function associated with the neuron, wherein the respective activation function has one or more asymmetric update regions and a standard update region associated therewith;
determining, by the computing system, a gradient update based at least in part on the pre-activation value associated with the respective activation function and the gradient of the objective function relative to the neuron; and
when the pre-activation value is within one of the asymmetric update regions:
applying, by the computing system, a first update scheme to update the neuron according to the gradient update when a direction of the gradient update moves the neuron toward the standard update region; and
applying, by the computing system, a second, different update scheme to update the neuron according to the gradient update when the direction of the gradient update moves the neuron away from the standard update region;
wherein the first update scheme increases a magnitude of the gradient update or the second, different update scheme decreases the magnitude of the gradient update.

* * * * *